United States Patent [19]

Chong

[11] Patent Number: 4,647,054

[45] Date of Patent: Mar. 3, 1987

[54] COMBINED STROLLER CHAIR AND AUTOMOBILE RESTRAINT SEAT

[76] Inventor: Chae Y. Chong, 9602 Della Dr., Richmond, Va. 23233

[21] Appl. No.: 800,813

[22] Filed: Nov. 22, 1985

[51] Int. Cl.$^4$ .............................................. B62B 1/04
[52] U.S. Cl. .................................... 280/30; 280/643; 280/648; 297/254
[58] Field of Search ...................... 280/9, 30, 31, 648, 280/642, 643, 647, 648, 47.34, 47.38; 297/254

[56] References Cited

U.S. PATENT DOCUMENTS

| | | | |
|---|---|---|---|
| 2,393,020 | 1/1946 | Brede | 280/47.25 X |
| 2,625,407 | 1/1953 | Varner | 297/254 |
| 2,661,959 | 12/1953 | Bell | 280/47.25 |
| 2,720,911 | 10/1955 | Lantz | 280/30 |
| 2,990,190 | 6/1961 | Eriksen | 280/30 |
| 3,207,528 | 9/1965 | Hasche | 280/47.38 |
| 3,222,081 | 12/1965 | Harmon, Jr. | 280/649 X |
| 3,797,849 | 3/1974 | Sherman | 280/47.37 |
| 3,829,113 | 8/1974 | Epelbaum | 280/47.34 X |
| 3,944,241 | 3/1976 | Epelbaum | 297/254 X |
| 4,019,751 | 4/1977 | Nakao | 280/31 |

Primary Examiner—John J. Love
Assistant Examiner—Michael Mar
Attorney, Agent, or Firm—Norman B. Rainer

[57] ABSTRACT

A carrier apparatus for transporting infants in a seated position is comprised of a framework equipped with four wheels, and a seat embraced by the framework. The wheels are adapted to be deployed for rolling support of the apparatus whereby the apparatus functions as a stroller. The wheels can also be moved to raised positions beneath the seat, whereby the apparatus functions as a automobile safety restraint seat. In the restraint seat mode of function, the apparatus is held to the automobile seat by a telescopically descendable pushing handle, and an opposed anchoring bar disposed at the bottom rear of the framework.

8 Claims, 7 Drawing Figures

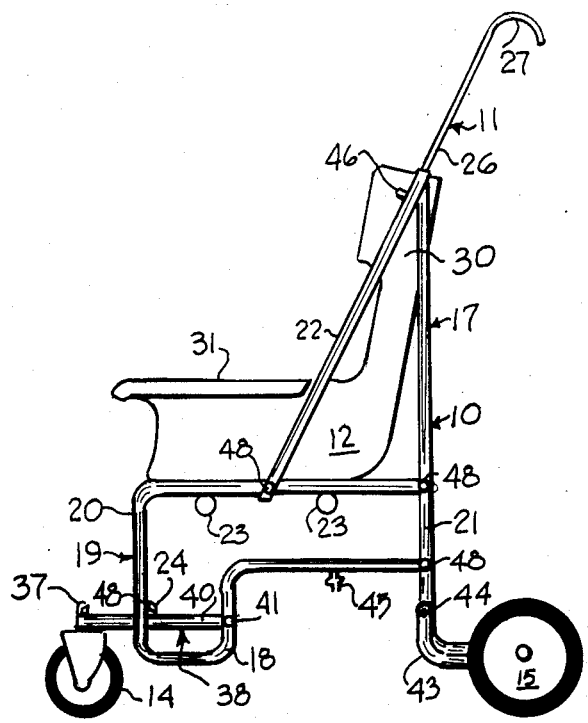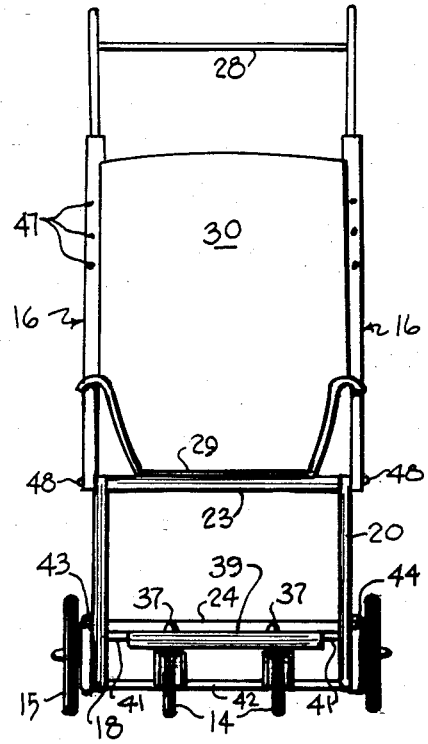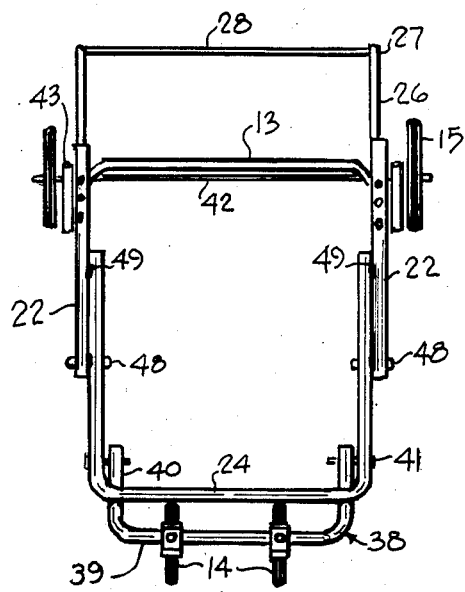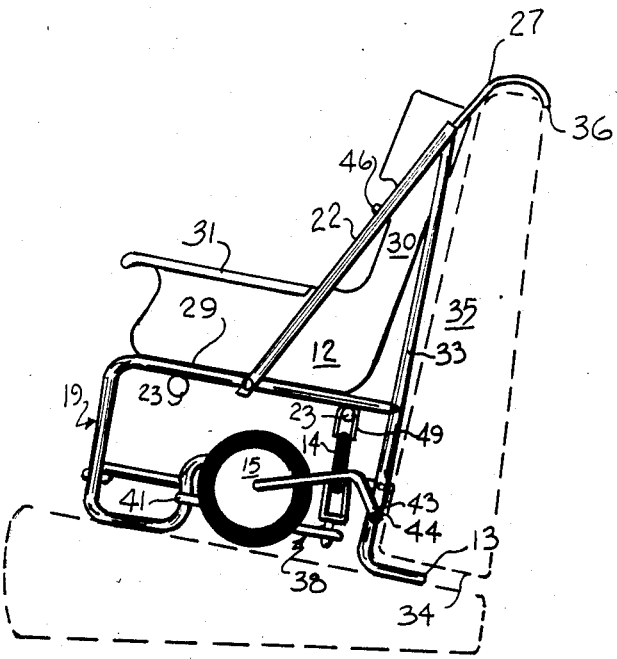

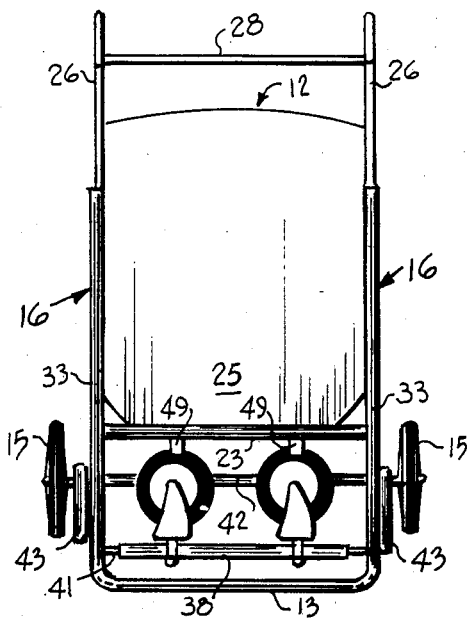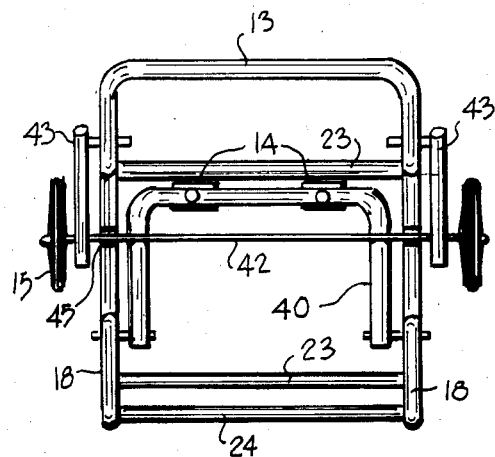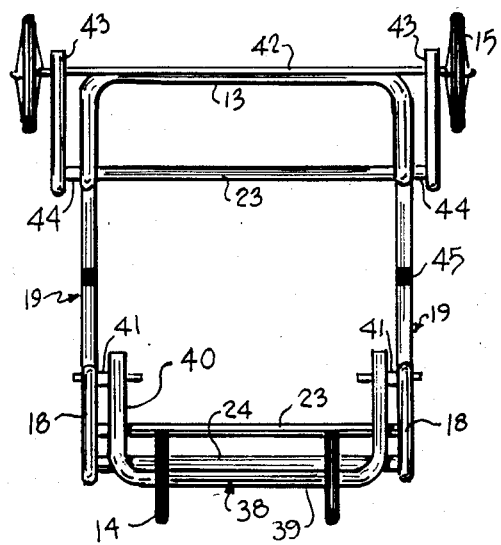

COMBINED STROLLER CHAIR AND AUTOMOBILE RESTRAINT SEAT

BACKGROUND OF THE INVENTION

This invention relates to apparatus for securing and transporting infants in a seated position, and more particularly concerns a stroller type of chair of lightweight construction equipped with wheels for rolling movement and interconvertible to a restraint seat for use in an automobile.

Several distinct varieties of apparatus have long been used for the safe transportation and securement of infants. For example, four-wheeled carriages adapted to be pushed by the parent are well known. However, unless the carriage is of small, lightweight construction, it is not easily manipulated in shopping environments, restaurants, or apartment buildings, nor is it easily stored or transported.

Small, two wheeled carts have been proposed for transporting children in a seated position, typical examples being shown in U.S. Pat. Nos. 2,990,190; 2,661,959; and 2,393,020. Although easier to manipulate, such carts are generally less resistent to toppling when unattended than four-wheeled carriages.

Compactly designed stroller chairs have been disclosed which are not only easily manipulated, but can also be emplaced upon the seat of an automobile to serve as a safety restraint seat. For example, U.S. Pat. No. 3,207,528 to Hasche describes a child's carriage equipped with four small wheels which support a seat a minimal distance above the ground. Because of the slight clearance between the seat and the rolling plane of the wheels, the carriage can be placed upon the seat of an automobile. However, the absence of clearance below the carriage seat causes the child to be uncomfortably seated because there is no opportunity for the legs to be located below the buttock as in normal seated posture. Furthermore, in the automobile restraint mode, the carriage is still mounted upon wheels which facilitate forward motion in the event of a head-on collision of the automobile.

The versatility of strollers has been enhanced in some instances by the provision of collapsible construction, as disclosed in U.S. Pat. No. 3,222,081 to Harmon, whereby the stroller can be converted to a mode facilitating storage and carrying. Although efforts to provide greater versatility have involved adjustable or collapsible seat portions and pushing handles, there has been no disclosure of the use of adjustably positionable wheels for changing the mode of use of the stroller. Also, in those instances where the seat portion is constructed so as to be collapsible, the comfort and protective aspects of the seat are generally diminished.

It is accordingly an object of this invention to provide an infant carrier of lightweight construction interconvertible between a stroller and a restraint seat for use in an automobile.

It is another object of this invention to provide an infant carrier as in the foregoing object which permits a comfortable seating posture in both stroller and restraint seat modes.

It is a further object of the present invention to provide an infant carrier of the aforesaid nature having a seat portion affording comfort and protection against impact injury.

It is still another object of this invention to provide an infant carrier of the aforesaid nature having four wheels disposed in a manner to resist toppling in the stroller mode.

These objects and other objects and advantages of the invention will be apparent from the following description.

SUMMARY OF THE INVENTION

The above and other beneficial objects and advantages are accomplished in accordance with the present invention by an infant carrier comprising:

(a) a rigid lightweight framework having spaced apart side portions, a back portion, a front portion, and a bottom portion, said portions defining an interior seating region, (b) a pushing handle of generally U-shaped configuration having opposed elongated side members which telescopically engage the side portions of the framework to permit elevational adjustment of said handle, downwardly directed hook-like portions disposed at the upper extremities of the side members, and a horizontally oriented gripping bar extending between said hook-like portions, (c) a seat supported by said framework within said seating region and comprised of a substantially horizontally disposed lower portion and an upright backrest portion disposed at the rear of said lower portion, (d) a horizontally oriented anchoring bar associated with the bottom portion of said framework and rearwardly displaced therefrom, (e) a pair of forward wheels mounted upon first bracket means pivotably attached to the framework in a manner to permit said forward wheels to be swung rearwardly in vertical paths from a forward operational location to a stored location beneath said seat, (f) means for securing said first bracket means when said forward wheels are in their operational and stored locations, (g) a pair of rear wheels mounted upon second bracket means pivotably attached to the framework in a manner to permit said rear wheels to be swung forwardly and upwardly in vertical paths from a rearward operational location to a stored location beneath said seat, and (h) means for securing said second bracket means when said rear wheels are in their operational and stored locations, (i) whereby, when both pairs of wheels are in their operational locations, the carrier functions as a stroller, and when said wheels are in their stored locations, the carrier is adapted to function as a restraint seat for use in an automobile.

In preferred embodiments of the infant carrier of this invention, the framework is fabricated of tubular metal which is bent whenever possible to accommodate the requirements of the carrier. The pushing handle is preferably an integral piece of tubular metal suitably bent to form said hook-like portions and gripping bar. The back rest portion of the seat may be adapted to be controllably tilted rearwardly to different positions of inclination with respect to the lower portion of the seat. The forward wheels are preferably of the caster-type, permitting omnidirectional rolling movement. The rear wheels are preferably constrained to rolling movement in fixed parallel vertical planes outwardly spaced from the side portions of the frame. Arm rests may be associated with the side portions of the framework, and adjustable foot rest means may be supported by the framework beneath said seat. Restraining means such as a belt or harness may be associated with the seat for securing the infant in the seat.

BRIEF DESCRIPTION OF THE DRAWING

For a fuller understanding of the nature and objects of the invention, reference shoulc be had to the following detailed description taken in connection with the accompanying drawing forming a part of this specification and in which similar numerals of reference indicate corresponding parts in all the figures of the drawing:

FIG. 1 is a side view of an embodiment of the infant carrier of this invention shown in the stroller mode of function.

FIG. 2 is a top plan view of the carrier of FIG. 1 with the seat removed.

FIG. 3 is a front view of the carrier shown in FIG. 1.

FIG. 4 is a side view of the infant carrier of FIG. 1 shown in its restraint seat mode of function.

FIG. 5 is a rear view of the carrier shown in FIG. 4.

FIG. 6 is a bottom view of the infant carrier in its restraint seat mode of function.

FIG. 7 is a bottom view of the infant carrier in its stroller mode of function.

DESCRIPTION OF THE PREFERRED EMBODIMENT

Referring to the drawing, an embodiment of the infant carrier of this invention is shown comprised of a tubular metal framework 10, pushing handle 11, seat 12 supported by said framework, anchoring bar 13 disposed beneath said seat, forward wheels 14, and rear wheels 15.

Framework 10 is generally comprised of spaced apart side portions 16, back portion 17, front portion 20, and bottom portion 18, although individual tubular members of the framework may be construed as belonging to more than one of said portions of the framework. Specifically, paired first pieces of tubing 19 are shown disposed on each side of the framework and bent in a manner such that they constitute parts of the side, back, front, and bottom portions of the frame. A second piece of tubing 21, having opposed straight vertical legs 33, is shown bent in a manner such that it constitutes parts of the side, back, and bottom portions of the frame. Paired third pieces of tubing 22 are shown dispoed on each side of the framework in diagonal extension between said first and second pieces of tubing. Paired forth pieces of tubing 23 are horizontally disposed straight parallel support struts extending perpendicularly between said paired first pieces 19. A forth piece of tubing 24 extends horizontally between paired first pieces 19 at the front portions thereof. The several pieces of tubing may be joined by machine bolts 48 or by welding, as at intersections 50. The tubes may be flattened at their sites of joinder. The general contour of the framework is such as to define an interior seating region 25.

The pushing handle 11 is of generally U-shaped configuration, having opposed elongated side members 26 adapted to fit in sliding telescopic engagement within said diagonally disposed third pieces of tubing. Said handle is thereby enabled to be adjustably raised or lowered. Locking means of conventional design are used to hold the handle at any desired elevation. Such locking means may, for example, be comprised of a spring-urged locking button 46 on one of the telescoping members and a series of apertures 47 on the other telescoping member adapted to be insertively engaged by said button. Paired hook-like bent portions 27 are positioned at the uppermost extremity of the pushing handle and downwardly directed. A horizontally oriented gripping bar 28 extends between the downwardly directed extremities of said hook-like portions.

Seat 12, positioned within seating region 25, is shown as a monolithic structure molded of plastic and comprised of horizontally disposed lower portion 29, upright backrest portion 30 disposed at the rear of said lower portion, and paired armrest portions 31. The seat is attached to paired forth pieces of tubing 23 using conventional threaded fastening means. Other types of seats may be employed and attached in different ways to the framework.

Anchoring bar 13 is horizontally positioned at the lowermost extremities of vertical legs 33, and rearwardly displaced therefrom. The function of the anchoring bar is to enter the space 34 between the upright and horizontal portions of an automobile seat 35, as shown in FIG. 4. When the telescoping handle is then lowered so that hooks 27 engage the upper extremity 36 of the automobile seat, the infant carrier is secured to the automobile seat.

Forward wheels 14 are of caster design, adapted to swivel 360 degrees about the vertical axes of mounting posts 37 which attach the wheels to first bracket 38. Said first bracket is a piece of tubing bent in U-shape having a forward bar portion 39 and opposed said bar portions 40 which attach by pivot means 41 to tubing 19 adjacent the bottom portion of the framework. By virtue of its configuration and manner of attachment to the frame, bracket 38 is capable of being swung in a vertical path between its forward active position, shown in FIG. 1, and its rearward storage position, shown in FIG. 4. In said forward position, said bar portions 40 of said first bracket abut against said forth piece of tubing 24, thereby preventing further upward motion of the bracket and attached wheels. In its rearward storage position, and bracket places the forward wheels beneath the seat. The bracket and wheel assembly may be secured in said storage position by spring clips 49 affixed to tubing 23 in a manner to grip wheels 14, as shown in FIG. 5. Alternative securing means may, however be utilized in both the active and storage positions of the bracket and wheel assembly.

Rear wheels 15 are rotatively positioned upon axle 42 journaled to paired second bracket arms 43 which are attached by pivot pins 44 to vertical legs 33. Said rear wheels are thereby positioned outside of the framework and are adapted to be swung in a vertical path between a rearwardly disposed operational mode and a forward and upwardly disposed position beneath the seat, representing a storage mode. In the rearward, operational mode, further upward pivotal motion of wheel-holding bracket arms 43 is prevented by the abutment of axle 42 against anchoring bar 13. Said rear wheels are held in their storage mode by paired securing spring clips 45 attached to tubing 19 of the framework.

By virtue of its specialized construction, the infant carrier of this invention can be easily interconverted between a stroller chair and a safety restraint seat for use on an automobile seat. Because the wheels of the carrier are not in contact with the seat of the automobile, and because the carriage is anchored to the backrest portion of the automobile seat, regardless of its size, the carrier is securely emplaced and will resist forward movement in the case of a head-on collision of the automobile.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for transporting infants in a seated position comprising:
   (a) a rigid lightweight framework having spaced apart side portions, a back portion, a front portion, and a bottom portion, said portions defining an interior seating region,
   (b) a pushing handle of generally U-shaped configuration having opposed elongated side members which telescopically engage the side portions of the framework to permit elevational adjustment of said handle, hook-like portions disposed at the upper extremities of the side members and having downwardly directed extremities, and a horizontally oriented gripping bas extending between said extremities of said hook-like portions,
   (c) a seat supported by said framework within said seating region and comprised of a substantially horizontally disposed lower portion and an upright backrest portion disposed at the rear of said lower portion,
   (d) a horizontally oriented anchoring bar associated with the bottom and back portions of said framework,
   (e) a pair of forward wheels mounted upon first bracket means pivotably attached to said framework for rotation about a transverse axis to permit said forward wheels to be swung rearwardly from a forward operational position to a stored position beneath said seat,
   (f) first clip means for releasably retaining said forward wheels, with the rotational axis of the wheels extending parallel to the longitudinal axis of the framework, when said first bracket means with said forward wheels are secured in their stored position,
   (g) a pair of rear wheels mounted upon an axle secured to second bracket means pivotably attached to said framework for rotation about a transverse axis manner to permit said rear wheels to be swung forwardly from a rearward operational position to a stored position beneath said seat, and
   (h) second clip means for releasably retaining said axle when said second bracket means with said rear wheels are secured in their stored position,
   (i) whereby, when both pairs of wheels are in their operational positions, the apparatus functions as a stroller, and when said wheels are in their stored positions, the apparatus is adapted to function as a restraint seat for use in an automobile.

2. The apparatus of claim 1 wherein said framework is fabricated of tubular metal.

3. The apparatus of claim 2 wherein said pushing handle is an integral piece of tubular metal suitably bent to form said hook-like portions and gripping bar.

4. The apparatus of claim 1 wherein said forward wheels are of caster-type capable of omnidirectional rolling movement.

5. The apparatus of claim 1 wherein said rear wheels are constrained to rolling movement in fixed parallel vertical planes outwardly spaced from the side portions of the frame.

6. The apparatus of claim 1 wherein said forward wheels are spaced closer together than said rear wheels.

7. The apparatus of claim 1 wherein when said forward and rear wheels are in said operational position, further upward pivotal movement is prevented by abutment of said first bracket means and said axle with said framework.

8. The apparatus of claim 1 wherein said forward and rear wheels are at a higher elevation with respect to the framework in their stored positions than in their operational positions.

* * * * *